May 13, 1941.  W. L. ROESSNER  2,241,888
VEHICLE LIGHT
Filed Feb. 15, 1939
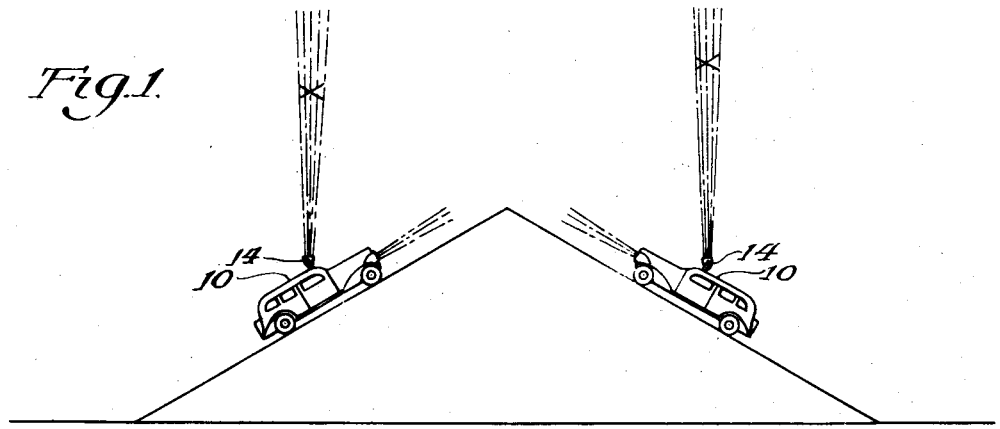
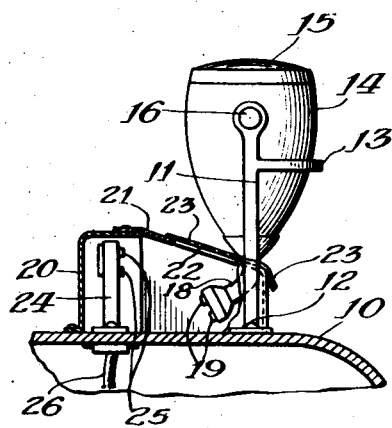 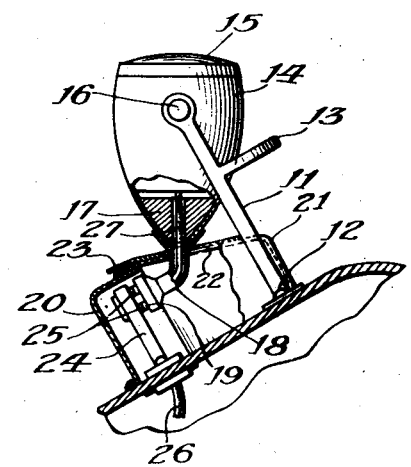
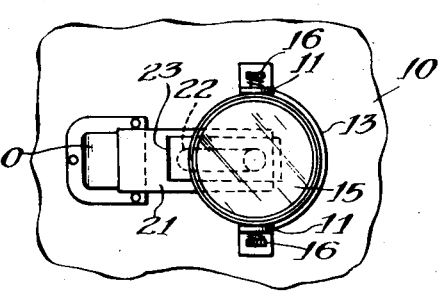
Inventor:
William Louis Roessner,
By Bertha L. MacGregor
Attorney.

Patented May 13, 1941

2,241,888

UNITED STATES PATENT OFFICE 2,241,888

VEHICLE LIGHT

William Louis Roessner, Denver, Colo., assignor to Bertha L. MacGregor, as trustee Application February 15, 1939, Serial No. 256,414

3 Claims. (Cl. 240—7.1)

This invention relates to a safety device for vehicles, and particularly to light producing means mounted on automobiles and other vehicles for indicating their presence or approach when out of sight, as when traveling upwardly on an inclined surface.

The main object of the invention is to provide automobiles and other vehicles with lights which automatically adjust their positions, when the vehicles travel or stand on upwardly inclined surfaces, to project rays of light upwardly in a vertical or substantially vertical direction.

Another object is to provide means for automatically illuminating the lamps when the vehicles travel or stand on upwardly inclined surfaces.

The invention is especially designed to indicate the presence or approach of a vehicle on an upwardly inclined surface to the driver of another vehicle approaching in the opposite direction, who could not see the ordinary headlights of the other's car and could not otherwise know of its presence or approach. The invention may also be used to indicate the location of a vehicle in a forest or other place where headlights would not be visible to others seeking to locate it.

Other objects and advantages will be apparent from the following specification.

In the drawing:

Fig. 1 is a diagrammatic view showing two automobiles traveling toward each other on upwardly inclined surfaces, the automobiles being equipped with my invention.

Fig. 2 is a longitudinal sectional view, partly in elevation, showing part of a vehicle body on which is mounted one embodiment of my invention, the parts being shown as they appear when the vehicle is standing or traveling on a horizontal surface.

Fig. 3 is a view similar to Fig. 2 but showing the parts as they appear when the vehicle is on an upwardly inclined surface.

Fig. 4 is a top plan view of Fig. 2.

In that embodiment of the invention shown in the drawing, 10 indicates part of the top wall of an automobile body on which the invention is mounted, but it is to be understood that my lighting device may be mounted on the fenders, hood or other suitable supporting surface.

The invention comprises a pair of spaced, parallel, upright supports 11, mounted on the support 10 by any suitable means, as screws 12, and preferably having an integrally formed curved piece 13 extending forwardly across the space from one support 11 to the other. A lamp having a casing 14 and lens 15 is pivotally mounted in the upper ends of the supports 11, between said supports, by headed pivot pins 16 which may be spring pressed and adjustable. The lamp is weighted as indicated at 17, and from its lower end extends a contact arm 18 provided with electrical contacts 19, 19, insulated from each other.

A housing 20 is secured to the support 10 adjacent the lamp 14, partly between the uprights 11, and is provided with a top 21 slotted at 22 to receive the arm 18 of the lamp. A flexible cover 23 is apertured to fit on the arm 18 and overlies the slotted top 21 of the housing 20 to close the slot 22. Within the housing 20 is a stationary contact member 24, fixed on the support 10, and provided with a pair of electrical contacts 25, 25. Wiring 26 from the ignition system of the automobile conducts electrical current to and from the contacts 25. The lamp wiring is indicated at 27.

When the vehicle is on a horizontal surface, the lamp circuit contacts 19 on the arm 18 are out of contact with the contacts 25 on the stationary contact member 24, as shown in Fig. 2, but as soon as the vehicle is on an upwardly inclined surface, the lamp 14 swings on the pivot points 16, and the arm 18 moves rearwardly of the car, moving the contact points 19 into contacting position relatively to the stationary points 25, as shown in Fig. 3, thereby illuminating the lamp 14 and throwing the rays of light upwardly, in a vertical or substantially vertical direction, visible to an approaching driver who can see the rays at the point indicated at X in Fig. 1. The cross piece 13 prevents swinging movement of the lamp when the vehicle is on a downwardly inclined surface. The space between the contacts 19 and 25, when the vehicle is on a horizontal surface, may be varied, but I prefer to limit the space so that contact will be made and the lamp illuminated when a gently inclined surface is being traversed.

The lamp may be moved manually into contacting position relatively to the stationary contact member when the vehicle is on a horizontal surface, to project rays upwardly to indicate the presence of the car. The housing construction is designed to protect the electrical contacts without interfering with the movement of the lamp 14 and arm 18. A very high powered light may be used because its rays will not be directed toward any other driver. The weighting of the lamp insures good contacts between the contacts 19 and 25.

Changes may be made in the details of construction without departing from the scope of my invention.

I claim:

1. A vehicle light comprising a lamp having a lens, a support adapted to be mounted on a vehicle, means pivotally connecting the lamp to the support with the lens facing upwardly, said means permitting free automatic swinging movement of the lamp relatively to the support when the position of the support relatively to a horizontal plane is being varied, whereby the lamp lens is automatically maintained in substantially upwardly facing position, electrical contact members on the lower end of the lamp, and a stationary contact member adjacent the lamp, said lamp swinging automatically into and out of contact making position when mounted on a vehicle traveling over horizontal and inclined surfaces.

2. A vehicle light comprising a lamp having a lens, a support adapted to be mounted on a vehicle, means pivotally connecting the lamp to the support with the lens facing upwardly, said means permitting free automatic swinging movement of the lamp relatively to the support when the position of the support relatively to a horizontal plane is being varied, whereby the lamp lens is automatically maintained in substantially upwardly facing position, electrical contact members on the lower end of the lamp, a stationary contact member adjacent the lamp, said lamp swinging automatically into and out of contact making position when mounted on a vehicle traveling over horizontal and inclined surfaces, and a slotted housing covering the stationary contact member, the lower end of the lamp extending through said slotted housing and being movable in said housing.

3. A vehicle light comprising a lamp having a lens, a support adapted to be mounted on a vehicle, means pivotally connecting the lamp to the support with the lens facing upwardly, said means permitting free automatic swinging movement of the lamp relatively to the support when the position of the support relatively to a horizontal plane is being varied, whereby the lamp lens is automatically maintained in substantially upwardly facing position, electrical contact members on the lower end of the lamp, a stationary contact member adjacent the lamp, said lamp swinging automatically into and out of contact making position when mounted on a vehicle traveling over horizontal and inclined surfaces, a slotted housing covering the stationary contact member, the lower end of the lamp extending through said slotted housing and being movable in said housing, and a flexible cover attached to the lower end of the lamp and overlying the slotted housing.

WILLIAM LOUIS ROESSNER.